Patented Apr. 25, 1944

2,347,370

UNITED STATES PATENT OFFICE 2,347,370

PROCESS FOR PREPARING SHEET RUBBER

Ben W. Rowland and Douglas Fronmuller, Appleton, Wis., assignors to The Institute of Paper Chemistry, a corporation of Wisconsin No Drawing. Application March 23, 1942, Serial No. 435,830

5 Claims. (Cl. 260—744)

The present invention relates to the process of preparing sheet rubber, and more particularly to the process of preparing sheet rubber from aqueous latex dispersions.

The principal object of the present invention is to provide an improved process of preparing sheet rubber.

Another object of the present invention is to provide a continuous process for preparing sheet rubber from latex.

Other objects of the present invention will be apparent as the detailed description proceeds.

The rapid formation of a sheet of coagulated latex i. e. a sheet of uncured rubber, from latex dispersions has presented many difficulties, and this is particularly true with synthetic rubber dispersions. Attempts, for example, to employ processes of the type used in sheet formation in the paper art have proved unsatisfactory. In such processes with available latex dispersions it was found that the latex was subject to excessive premature agglomeration resulting in poor formation. In addition, the prior sheets were frequently found to be too thick and not of sufficient strength for a satisfactory continuous operation. Attempts to overcome these disadvantages with commercially practical materials proved unsuccessful.

We discovered after a diligent research investigation that the above difficulties and disadvantages could be overcome by the use of a small amount of pine oil and preferably a water soluble pine oil, such as the sulfonated pine oil of commerce, i. e. pine oil approximately 50 percent sulfonated. We also discovered that curd formation and agglomeration could be advantageously controlled by the use of a small amount of acid stable sulfonated rosin.

The sulfonated rosin used in the preferred process of the present invention is acid stable. Suitable methods of preparing this ingredient are described in the application of Douglas Fronmuller and Berwyn B. Thomas Serial No. 436,616, filed March 28, 1942. An illustrative method is as follows:

Dissolve 25 grams of rosin of good grade or purified abietic acid in 250 ml. of liquid $SO_2$, at $-10°$ C. Add to this solution 25 ml. of ether. The catalyst used was 0.125 gram of aluminum borate (commercially pure grade).

To the batch prepared as above described, there is then added, drop by drop, 12.5 ml. of 60% fuming sulfuric acid. This requires about 15 minutes. After all of the sulfuric acid has been added, the mixture is stirred continuously for about 3 hours, and from time to time, additional quantities of liquid $SO_2$ are added in order to make up for loss by evaporation.

After the reaction is substantially complete, the batch is discharged into 125 grams of ice together with 125 ml. of ether and is allowed to warm up until the ice melts.

When the ice has all been melted, 20 grams of sodium carbonate (soda ash) are added, and the material is heated to $20°$ C. The ether is then decanted, or separated in any other suitable manner, from the aqueous solution. Preferably, the solution is then washed a second time with 100 ml. of ether, which is separated as before. The aqueous solution is then boiled free of $SO_2$ and is ready for use.

The present invention may be used in forming sheets from aqueous dispersions of partially polymerized unsaturated hydrocarbons such as butadiene, dimethyl butadiene, isoprene, styrene, and the like. These materials also may include partially polymerized vinyl compounds such as vinyl chloride, vinyl bromide, vinyl cyanide, vinyl acetate, vinyl alcohol, etc.

The latex dispersions suitable for use in the present invention may also include in addition to rubber solids materials such as soap stabilizing agents (e. g. sodium myristate), polymerization catalysts, antioxidants, etc. The latex dispersions are usually alkaline in character due to the presence of soap or other alkaline materials.

The following example will serve to illustrate the present invention.

About 100 parts of an alkaline latex emulsion containing about 28 parts of rubber solids and other materials such as described above, is mixed with agitation with about 100 parts of a warm (e. g. $128°$ F.) aqueous solution containing about 10 percent salt (NaCl) and about 1 percent sodium bicarbonate ($NaHCO_3$). The resulting mixture is subjected to continued agitation and a fine curding or partial agglomeration of the latex particles takes place. To this mixture is next added about 0.3–1.5 percent sulfonated pine oil and 0.2–0.6 percent acid stable sulfonated rosin, the percentages of sulfonated ingredients being based on rubber solids. The mixture is then agitated until a homogeneous dispersion is formed.

Agitation is continued and dilute sulfuric acid of about 0.25–0.5% is then run into the dispersion, care being taken to avoid local agglomeration. When the dispersion has reached approximately the neutral point, additional sulfuric acid of about 2.0% concentration is run into the dispersion until a pH of about 3.4 is reached, a pH of about 3.5 being preferred. The dispersion is then diluted with brisk agitation with soft water at about 50° C. until a final dispersion is formed having about 7–10 percent rubber solids.

The above dispersion is then ready for sheet formation which may be carried out on a paper machine as follows. The dilute dispersion is run into a head box where it is allowed to spill over or flow onto the moving Fourdrinier wire. The web which is thus formed on the wire is pressed (e. g. with a dandy roll). Before or after pressing and while still on the wire the web is washed with hot water at about 168° F. and then with cold water. The coagulated latex which is now in coherent sheet form is removed from the wire by a suction couch roll in accordance with standard practices in the paper art. The resulting latex sheet is dried in any suitable manner and is then ready for milling and compounding in accordance with standard practices in the rubber art.

It will be understood that the above example is only illustrative. For example, the sulfonated rosin need not be used although it has been found to cooperate particularly well with the pine oil and produce the type of sheet desired. Its use aids in controlling curd formation as well as latex agglomeration, and as it is acid stable it is not deleteriously effected by the acid pH of the final dispersion. A material having such properties as pine oil or preferably partially sulfonated pine oil preferably should be used, as it is highly effective for controlling curd formation as well as for latex agglomeration. Of special importance the pine oil has been found to soften and impart tackiness to the latex curd and thus provide desirable cohesion for proper sheet strength. The sulfonated pine oil is hydrolyzed in the acid dispersion i. e. loses $SO_3$ groups, and in this condition acts to control agglomeration as well as soften and impart tackiness to the latex curd. As the effectiveness of sulfonated pine oil to control agglomeration is diminished by hydrolysis, it is preferred to use the pine oil in conjunction with the acid stable sulfonated rosin.

The expression "acid stable" as used herein is intended to refer to the effectiveness of the sulfonated rosin in stabilizing the suspension under acid conditions.

It will be understood that addition of the ingredients may be varied as desired. For example, the latex may be added to the salt or the salt to the latex, the sulfonated rosin may be added after acidification, etc. It will also be understood that other equivalent ingredients may be added or used in place of the ingredients specified. The conditions specified in the example are illustrative. The temperatures and concentrations may be varied although the specifications given in the example under the conditions specified give excellent results.

The process of the present invention provides for ready control of curd formation and agglomeration and the latex suspension is particularly adaptable for a continuous operation. The rubber sheets formed according to processes described have good formation and are thin and strong.

The scope of the invention should be determined by reference to the appended claims.

We claim:

1. In the process of preparing a latex suspension adaptable for use in a continuous process of preparing sheet rubber, the steps which comprise (a) partially agglomerating latex to form a fine curd by adding sodium chloride to an alkaline latex dispersion, (b) adding a small amount of sulfonated pine oil to the curd suspension (a) and (c) acidifying the suspension of (b) to form a final suspension having a pH value of about 3 to 4.

2. In the process of preparing a latex dispersion adaptable for use in a continuous process of preparing sheet rubber, the steps which comprise (a) partially agglomerating latex to form a fine curd by adding sodium chloride and a relatively minor proportion of sodium bicarbonate to a soap stabilized rubber latex dispersion, (b) adding small amounts of sulfonated pine oil and acid stable sulfonated rosin to the curd suspension of (a), and (c) acidifying the suspension of (b) by adding thereto sufficient sulfuric acid to form a final suspension having a pH of about 3.5.

3. A composition adaptable for use in a continuous process for preparing sheet rubber, containing as essential ingredients an aqueous latex curd suspension and small amounts of sulfonated pine oil and acid stable sulfonated rosin.

4. A composition adaptable for use in a continuous process for preparing sheet rubber, containing as essential ingredients an aqueous rubber latex curd suspension and small amounts of sulfonated pine oil and acid stable sulfonated rosin, said composition having a pH of about 3 to 4.

5. A composition adaptable for use in a continuous process for preparing sheet rubber, containing as essential ingredients an aqueous rubber latex curd suspension and small amounts of sulfonated pine oil and acid stable sulfonated rosin, said composition having sufficient sulfuric acid present to give a pH of about 3.5.

BEN W. ROWLAND.
DOUGLAS FRONMULLER.